United States Patent
Bechtolsheim et al.

(10) Patent No.: US 11,385,426 B2
(45) Date of Patent: Jul. 12, 2022

(54) PLUGGABLE OPTICS MODULE WITH OCTAL SN OR MDC SOCKETS

(71) Applicant: Arista Networks, Inc., Santa Clara, CA (US)

(72) Inventors: Andreas Bechtolsheim, Portola Valley, CA (US); Youngbae Park, Milpitas, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/196,989

(22) Filed: Mar. 9, 2021

(65) Prior Publication Data
US 2021/0263247 A1    Aug. 26, 2021

(51) Int. Cl.
*H04B 10/00*    (2013.01)
*G02B 6/42*    (2006.01)

(52) U.S. Cl.
CPC ......... *G02B 6/4292* (2013.01); *G02B 6/4246* (2013.01); *G02B 6/4261* (2013.01)

(58) Field of Classification Search
CPC combination set(s) only.
See application file for complete search history.

(56) References Cited

U.S. PATENT DOCUMENTS

| | | | |
|---|---|---|---|
| 9,726,830 B1 * | 8/2017 | Gniadek | G02B 6/3825 |
| 9,793,667 B1 * | 10/2017 | Park | H04B 10/25 |
| 9,876,576 B2 * | 1/2018 | Ho | G02B 6/4245 |
| 10,044,445 B2 * | 8/2018 | Ho | G02B 6/428 |
| 10,623,838 B1 * | 4/2020 | Mahdi Hayder | H04B 10/071 |
| 10,698,168 B1 * | 6/2020 | Lin | H01S 5/0235 |
| 10,741,943 B2 * | 8/2020 | Wilcox | H01R 12/515 |
| 10,877,232 B1 * | 12/2020 | Bailey | G02B 6/4284 |
| 10,903,905 B2 * | 1/2021 | Leigh | H04J 14/02 |
| 10,944,584 B1 * | 3/2021 | Cheng | H04L 25/4917 |
| 10,976,506 B2 * | 4/2021 | Matsui | G02B 6/4249 |
| 11,057,112 B1 * | 7/2021 | Lin | G02B 6/4256 |
| 11,105,990 B2 * | 8/2021 | Chang | G02B 6/4246 |
| 11,146,039 B2 * | 10/2021 | Lin | G02B 6/4296 |
| 11,177,886 B2 * | 11/2021 | Williams | H01S 3/1312 |
| 2014/0056592 A1 * | 2/2014 | McColloch | H04B 10/40 29/428 |
| 2015/0256259 A1 * | 9/2015 | Huang | H04B 10/506 398/139 |
| 2016/0192044 A1 * | 6/2016 | Raza | G02B 6/4292 398/49 |
| 2017/0077643 A1 * | 3/2017 | Zbinden | G02B 6/4268 |
| 2018/0295737 A1 * | 10/2018 | Balasubramanian | H04Q 1/02 |
| 2018/0299624 A1 * | 10/2018 | Leigh | G02B 6/3825 |
| 2019/0229809 A1 * | 7/2019 | Leigh | H04J 14/02 |
| 2020/0077531 A1 * | 3/2020 | Park | H04Q 1/06 |
| 2020/0153163 A1 * | 5/2020 | Guetig | H01R 13/6582 |

(Continued)

*Primary Examiner* — Agustin Bello
(74) *Attorney, Agent, or Firm* — Fountainhead Law Group PC

(57) ABSTRACT

Embodiments of the present disclosure include pluggable optical transceiver modules comprising a first interface on a proximate end and eight (8) sockets arranged on a distal end. A first portion of the pluggable optical transceiver module including the proximate end is inserted into a port. A second portion, including the distal end extends outside the port. In one embodiment, an OSFP optical transceiver module include sockets for eight (8) SN or MDC connectors.

18 Claims, 12 Drawing Sheets

(56) References Cited

U.S. PATENT DOCUMENTS

| | | | |
|---|---|---|---|
| 2020/0174207 A1* | 6/2020 | Cabessa | H01S 5/02251 |
| 2020/0301083 A1* | 9/2020 | Chang | G02B 6/4246 |
| 2020/0379183 A1* | 12/2020 | Son | G02B 6/32 |
| 2021/0011224 A1* | 1/2021 | Chen | G02B 6/3817 |
| 2021/0044356 A1* | 2/2021 | Aboagye | H04B 10/503 |
| 2021/0051099 A1* | 2/2021 | Iwasaki | H04L 49/30 |
| 2021/0084749 A1* | 3/2021 | Devalla | H01R 12/724 |
| 2021/0165176 A1* | 6/2021 | Chang | G02B 6/4257 |
| 2021/0165177 A1* | 6/2021 | Chang | G02B 6/4257 |
| 2021/0212193 A1* | 7/2021 | Deng | H05K 7/20409 |
| 2021/0231885 A1* | 7/2021 | Ger | G02B 6/3893 |
| 2021/0263247 A1* | 8/2021 | Bechtolsheim | G02B 6/4261 |
| 2021/0281323 A1* | 9/2021 | Williams | H01S 3/1312 |
| 2021/0281932 A1* | 9/2021 | Chaouch | H04Q 11/0005 |
| 2021/0333496 A1* | 10/2021 | Chang | G02B 6/4246 |
| 2022/0012206 A1* | 1/2022 | Bross | G06F 13/4072 |
| 2022/0052492 A1* | 2/2022 | Guo | H01R 13/659 |

\* cited by examiner

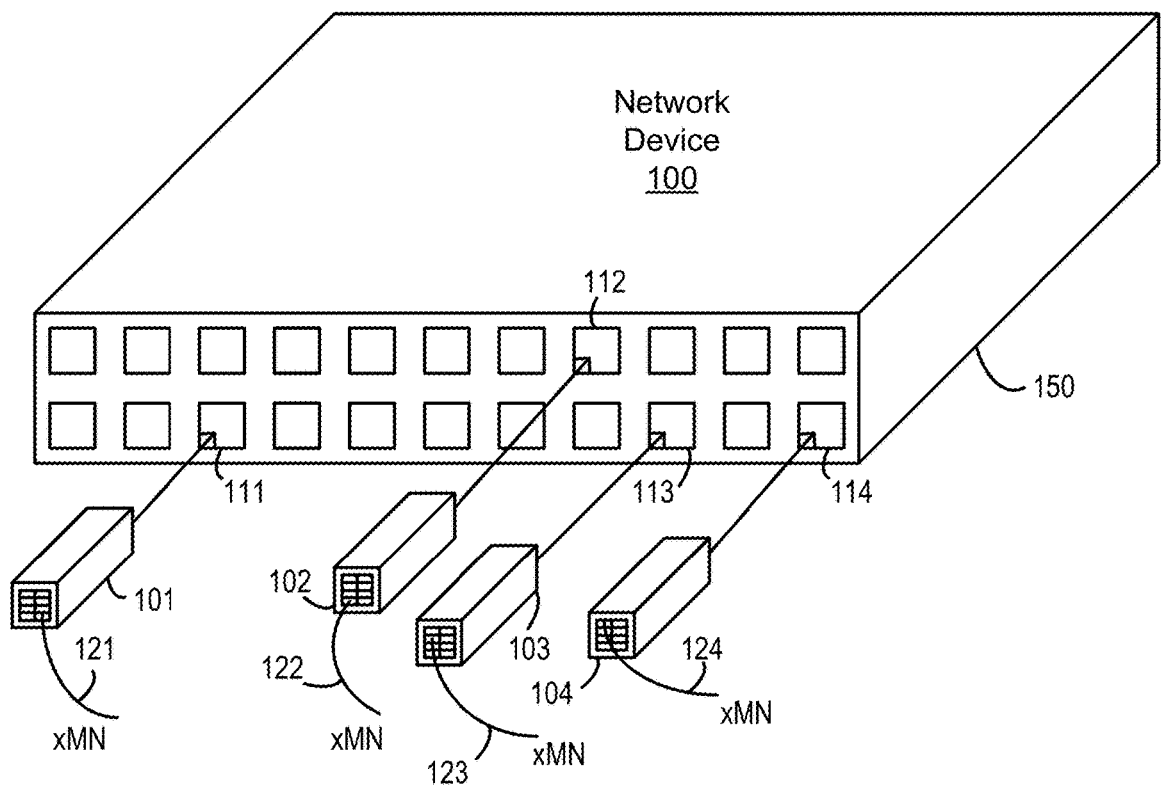
FIG. 1A
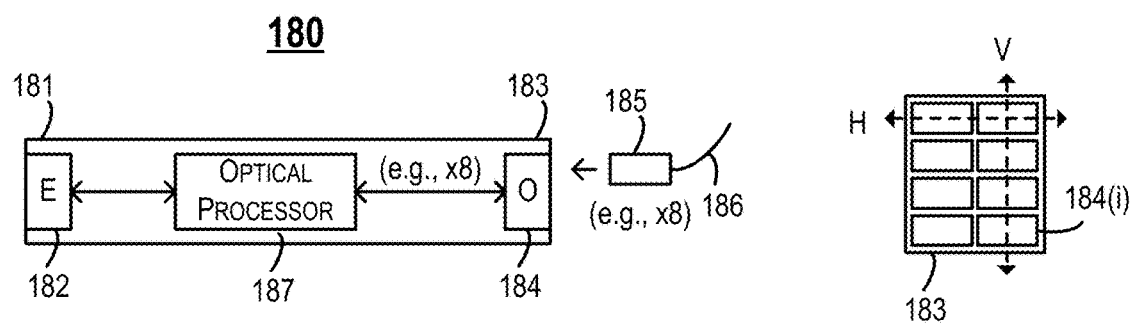
FIG. 1B              FIG. 1C

PLUGGABLE OPTICS MODULE WITH OCTAL SN OR MDC SOCKETS

BACKGROUND

The present disclosure relates generally to optical connectors and optical transceiver interfaces, and in particular, to an Octal Small Form factor Pluggable (OSFP) optical transceiver and fiber optic connector socket arrangement.

Octal Small Form factor Pluggable (OSFP) optical transceiver modules being used today for 400 G Ethernet applications typically include eight electrical interface lanes of 50 Gigabit/second each. On the optical side, a 400 G OSFP Module supports a range of optical interfaces and optical connectors, including the LC fiber connector for the 400 G-FR4/LR4 standard and the MPO fiber connector for 400 G-DR4, which uses four fiber pairs to carry the four 100 G Lambda optical signals.

In next generation systems the speed for the electrical interface lanes will increase to 100 Gigabits/second each. An OSFP optics module with 8 lanes of 100 G each will support an aggregate bandwidth of 800 G per module. In many cases, the 800 G bandwidth will be split into two separate 400 G ports to connect with other 400 G ports in the network. It is desirable to provide dual optical connectors for these dual 400 G ports directly on the 800 G optics module to avoid external splitter cables or fiber patch panels. For the dual 400 G-FR4 optical ports, the preferred optical connectors are dual LC or dual Mini-LC. For the dual 400 G-DR4 optical ports, the standard optical connectors are dual MPO.

Another way to use an 800 G-DR8 optics module is to break out the bandwidth into eight optical channels of 100 G-DR each. This is typically done with a 16-fiber MPO connector that uses an external splitter cable or an external fiber patch panel to convert the 16-fiber cable bundle into 8 individual duplex fiber circuits. However, the use of splitter cables or fiber patch panels reduces the integrity of the optical system and adds cost to the fiber network.

It would be desirable to have a pluggable optical module that directly supports eight optical channels with eight duplex connectors without requiring external splitter cables, patch panels, or optical adaptors. The present disclosure presents an innovative optical module design that addresses these and other challenges.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

FIG. 1A illustrates a network device with pluggable optical transceiver module according to an embodiment.

FIG. 1B illustrates a side view of a pluggable optical transceiver module according to an embodiment.

FIG. 1C illustrates a view of the distal end of a pluggable optical transceiver module and port according to an embodiment.

DETAILED DESCRIPTION

Figure 2:
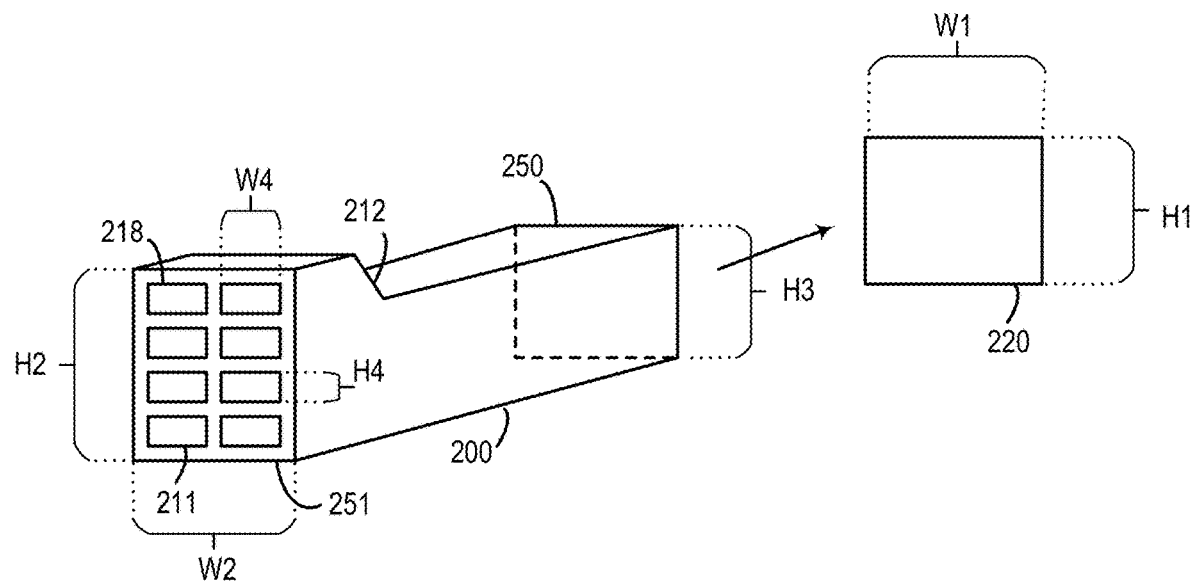
FIG. 2 illustrates a pluggable optical transceiver module and port according to an embodiment.

Described herein are techniques for a networking system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Features and advantages of the present disclosure include an optical transceiver module design adapted to split a multi-channel optical interface into multiple individual duplex optical channels with no need for fiber connectors that terminate more than one fiber per ferrule, for example Multi-fiber Push On (MPO) connectors, for example. Various embodiments described herein may split an octal optical channel into eight individual channels with duplex fiber connectors in order to reduce the amount of external fiber connections and reduce or even eliminate patch panels. In one example embodiment, an optical channel may be split into eight individual channels, for example, without requiring optical adapters. Various embodiments described herein may reduce optical losses and back reflections, for example, and may advantageously provide fiber length flexibility on separate optical channels to minimize additional fiber connectors in a network. In particularly advantageous embodiments, eight SN® or MDC connector sockets are integrated into a single OSFP module, thereby reducing the need for MPO terminations and external path panels, reducing the optical loss and back reflections, and providing length flexibility for the fiber of each individual optical channel to customers (SN® connectors are produced by Senko Advanced Components).

FIG. 1A illustrates a network device 100 according to an embodiment. Network device 100 may be a network switch, network router, or combined switch-router (e.g., a layer 2/layer 3 switch-router), for example. In one embodiment, network device 100 includes a chassis 150 and a plurality of switch ports (e.g., OSFP ports), such as switch ports 111-114, for example, which support a plurality of pluggable optical transceiver modules (aka "pluggable optical modules" or "optical modules"), such as modules 101-104. Ports 111-114 may be advantageously configured to receive different types of optical modules, including data-center optics and digital coherent optical modules. The pluggable optical modules 101-104 and ports 111-114 may utilize an industry standard form factor, such as OSFP (octal small form factor pluggable) or QSFP-DD (quad small form factor pluggable double density), for example, which are known to those skilled in the art. Pluggable modules 101-104 include an optical signal processor (aka, optical engine, not shown) configured between the OSFP or QSFP-DD compatible interface and optical fibers 121-124 to send and receive the optical signals. Accordingly, when pluggable optical modules 101-104 are inserted into the ports 111-114, the optical modules may send and/or receive data between network device 100 and optical fibers 121-124, for example.

As indicated above, it may be advantageous to have multiple pluggable optical fibers connected to each optical transceiver module (e.g., in order to split out different optical channels to different systems). Accordingly, in various embodiments, each pluggable optical transceiver module comprises a proximate end having a first interface and a distal end comprising a plurality of sockets configured to receive multiple fiber optic connectors. The proximate end may be configured to mate with a port. Once mated, one portion of the optical module, including the proximate end, may reside inside the port, while another portion of the optical module, including the distal end, may extend outside the port. For example, the first interface on the proximate end may be an Octal Small Form factor Pluggable (OSFP) compatible interface that engages a complementary OSFP interface inside the port for sending and receiving optical signals. The distal end of each pluggable optical transceiver module, which extends outside the port, includes eight duplex fiber sockets, which arranged in this example as a plurality of columns and a plurality of rows of sockets. Each socket is configured to receive a duplex fiber optic connector coupled to a first optical fiber for sending optical signals and a second optical fiber for receiving optical signals. Example duplex fiber optic connectors include mini-duplex connectors (MDC) or SN connectors, which are known to those skilled in the art. Accordingly, the sockets may be MDC sockets or SN connector sockets, for example. In some embodiments, other types of dual fiber optic connector sockets may be used to accommodate other dual fiber optic connectors known in the art. As illustrated in more detail below, arranging sockets as columns and rows allows many optical fibers to be plugged into the sockets of each optical module, which results in a variety of advantages in optical fiber networks as illustrated in various embodiments and examples below.

FIG. 1B illustrates a side view of a pluggable optical transceiver module 180 according to an embodiment. Module 180 includes a proximate end 181 having an electrical interface 182 compatible with a standard optical module port (e.g., an OSFP port). Module 180 further includes a distal end 183 including fiber optic sockets 184. The sockets 184 are advantageously arranged as a plurality of columns and a plurality of rows as illustrated in FIG. 1C, which is a view of the distal end 183 of module 180. Each socket 184 is configured to receive a fiber optic connector 185 coupled to a plurality of optical fibers 186 for sending and receiving optical signals. An optical signal processor 186 is coupled to the electrical interface 182 of the module and is further couple to a plurality of optical connections 188 configured between each socket 184(i) and a corresponding lens (not shown) in the optical signal processor for receiving optical signals from other optical transceiver modules and transmitting optical signals generated in said optical signal processor 187 to other optical transceiver modules. In one particularly advantageous example, module 180 is an OSFP module, interface 181 is an OSFP compatible interface, and the distal end 183 includes two (2) columns and four (4) rows of sockets 184 configured to split an 800 G-DR8 input into eight (8) separate duplex fiber connections. Each socket 184 may be configured to receive a SN or MDC fiber optic connector coupled to a plurality of optical fibers for sending and receiving optical signals, for example.

FIG. 2 illustrates a pluggable optical transceiver module 200 and port 220 according to an embodiment. In various embodiments, it may be advantageous to extend the optical module outside port 220 to provide a form factor that fits an arrangement for eight duplex fiber connectors. In some applications, ports may be spaced closely together along one dimension of a network device while there may be more available space along another dimension of the network device. Accordingly, as illustrated here, a portion of optical module 200, which includes the proximate end 250, has a first cross sectional area configured to fit within port 220 when mating with the port 220, and another portion of the optical module 200, which includes the distal end 251, is configured to extend outside port 220. The extending/exposed portion of optical module 200 comprises a second cross sectional area having a length along a first dimension (e.g., here, width) that is less than or approximately equal to the first cross sectional area and a length along a second dimension (e.g., here, height) that is greater than the first cross sectional area.

More specifically, in this example port 220 has a width W1 and height H1. Accordingly, a portion of optical module 200 configured to mate with (e.g., extend into) port 220 has a height H3, which is less than or approximately equal to port height H1. However, another portion of optical module 200 configured to extend outside of port 220 may have another height H2, which may be greater than the port height H1. On the other hand, in this example, the width W2 of optical module 200 is less than or approximately equal to the port width W1. Because the cross sectional area of the distal end 251 is greater than the cross sectional area of the proximate end 250, the distal end may be configured with more rows of sockets to accommodate more optical fibers.

As illustrated here, in some embodiments an optical module may include a taper 212 between the different cross sectional areas, for example.

FIG. 2 further illustrates one advantageous arrangement of sockets. In this example, eight (8) sockets 211-218 are included on the distal end 251 of optical module 200 in two (2) columns and four (4) rows. In various embodiments, fiber optic connectors coupled to optical fibers may be approximately oblong in shape (illustrated here as rectangles) and plug into sockets 211-218. Here, the sockets are configured to receive the fiber optic connectors horizontally along each row. For instance, an oblong fiber optic connector may have a long axis and a short axis (e.g., corresponding to long and short edges of the rectangles shown here). The sockets are configured such that the long axis of each fiber optic connector is along the horizontal axis and the short axis is along the vertical axis. By configuring the sockets horizontally along each row as shown, multiple columns of fiber optic connectors may be inserted for a given width W2 is less than or equal to W1 and rows of connectors may be densely stacked up to a height H2 greater than H1, for example. As illustrated further below, vertical rows of horizontal sockets may be advantageous in applications where ports are closely spaced together along the horizontal axis of a network chassis with more available space in the vertical direction near each port on the chassis, for example.

Figure 3:
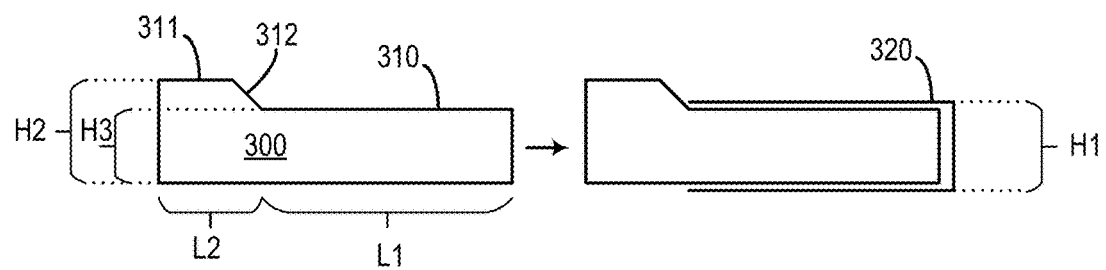
FIG. 3 illustrates a side view of a pluggable optical transceiver module mating with a port according to an embodiment.

FIG. 3 illustrates a side view of a pluggable optical transceiver module 300 mating with a port 320 according to an embodiment. In this example, port 320 has a height H1. A first portion L1 310 of optical module 300 has a height H3 that is less than or approximately equal to H1 so that portion L1 can extend into (mate with) port 320. A second portion L2 311 of optical module 300 has a height H2 that is greater than H1, which includes sockets for receiving optical fiber connectors as described above. Portion L2 311 extends outside port 320 when fully mated. In this example, a taper 312 along an upper surface of optical module 300 connects portions 310 and 311.

Figure 4:
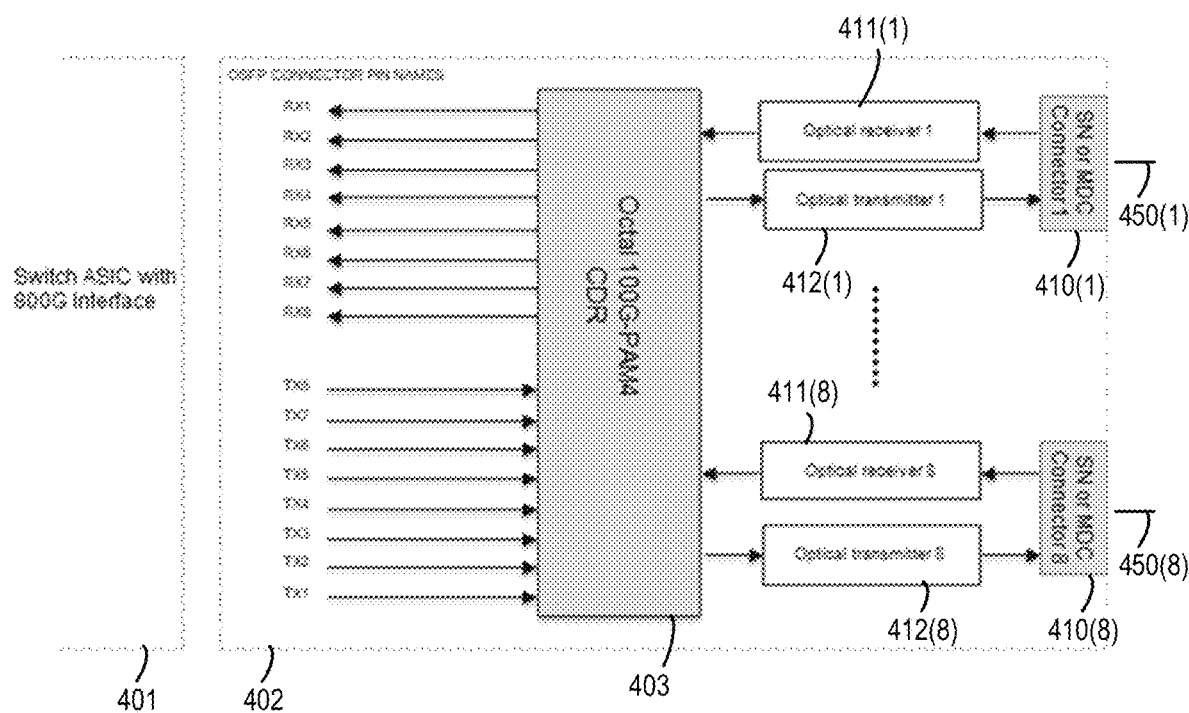
FIG. 4 illustrates an example pluggable optical transceiver schematic according to an embodiment.

FIG. 4 illustrates an example pluggable optical transceiver schematic according to an embodiment. In this example, a switch 401 includes application specific integrated circuit (ASIC) 800 interface forming the OSFP interface to send and receive data with an OSFP pluggable module 402. Pluggable module 402, in turn, is coupled to optical fibers 450(1)-(8) via eight (8) fiber optic sockets 410(1)-(8) that are integrated into OSFP optical module 402. As mentioned above, sockets and fiber optic connectors may be configured for MDC connectors or SN connectors. The eight SN or MDC sockets 410(1)-(8) feed the eight transceivers 411(1)-(8)/412(1)-(8), respectively, via eight independent fiber cables 450(1)-(8), each including of two optical fibers. Transceivers 411(1)-(8)/412(1)-(8) are coupled to an Octal 100 G-PAM4 clock data recovery (CDR), which is further coupled to OSFP interface comprising eight (8) receive and transmit lines.

Figure 5A:
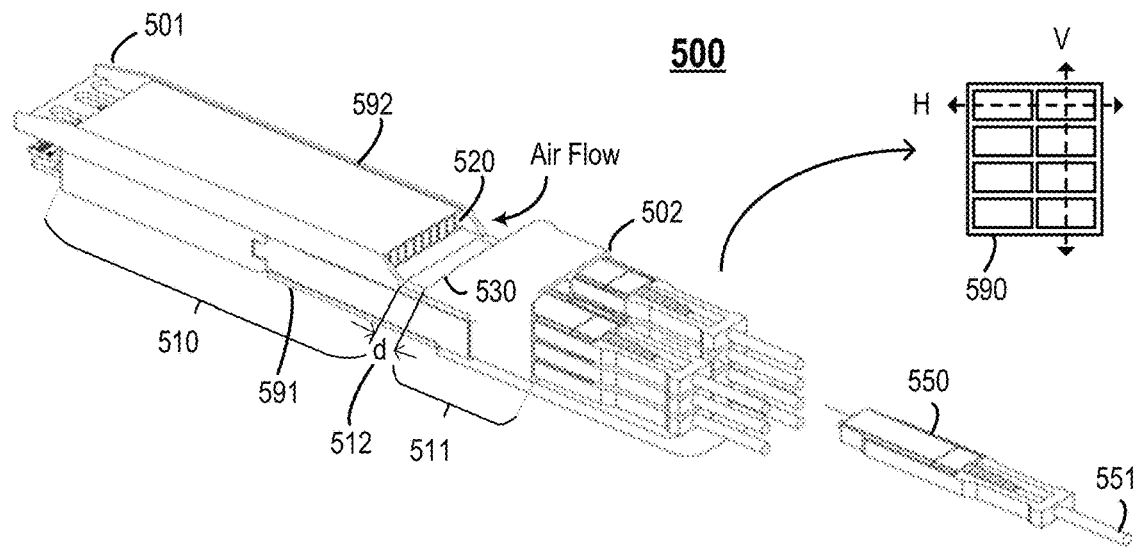
FIG. 5A illustrates a view of an example OSFP optical transceiver module according to an embodiment.

FIG. 5A illustrates a view of an example OSFP optical transceiver module 500 according to an embodiment. FIG. 5A illustrates a perspective view of a mechanical implementation integrating rows and columns of sockets into optical module 500. Typically, the body of OSFP optical transceiver 500 has a mounting baseplate 591 and an upper cover 592 with heat sink 520 for dissipating the heat. In order to fit 8 SN/MDC connectors on distal end 502 of OSFP optical module 500, the OSFP module includes an extended portion 511 with a taper 530 to increase the length along the vertical axis (i.e., the height) outside of a chassis front panel. The extended portion in this example is no wider than the OSFP optical module, but is tall enough to accommodate the arrangement of the 8 SN or MDC connectors.

Additionally, in this example and various embodiments, an open space 512 is included between the external portion 511 and mating portion 510. A space between the lower portion of the taper 530 and heat sink 520 advantageously allows airflow to circulate around the optical connectors and enter the cooling fins of the OSFP optical module.

Figure 5B:
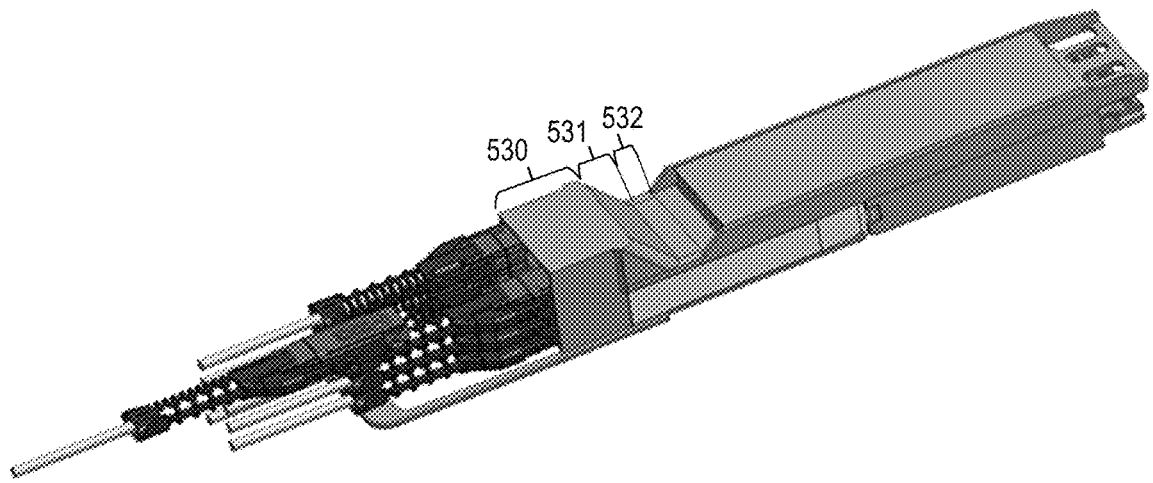
FIG. 5B illustrates another view of an example OSFP optical transceiver module according to an embodiment.

FIG. 5B illustrates another view of an example OSFP optical transceiver module according to an embodiment. FIG. 5B further illustrates the extended portion 530 of the optical module that houses optical connectors, taper 531, and open space 532. In this example, taper 531 is along the top surface of the module between an upper surface of extended portion 530 and open space 532. The depth of the extended portion 530 is designed to receive and mechanically secure the fiber connectors, for example. Space 532 is in the same plane as a surface in line with an entry point/input of the heat sink and forms an upper surface of the cross section of the module in this region. In this configuration, air can flow down the taper, over the edges of the upper surface on either side of space 532, and into the heat sink for cooling.

Figure 6A:
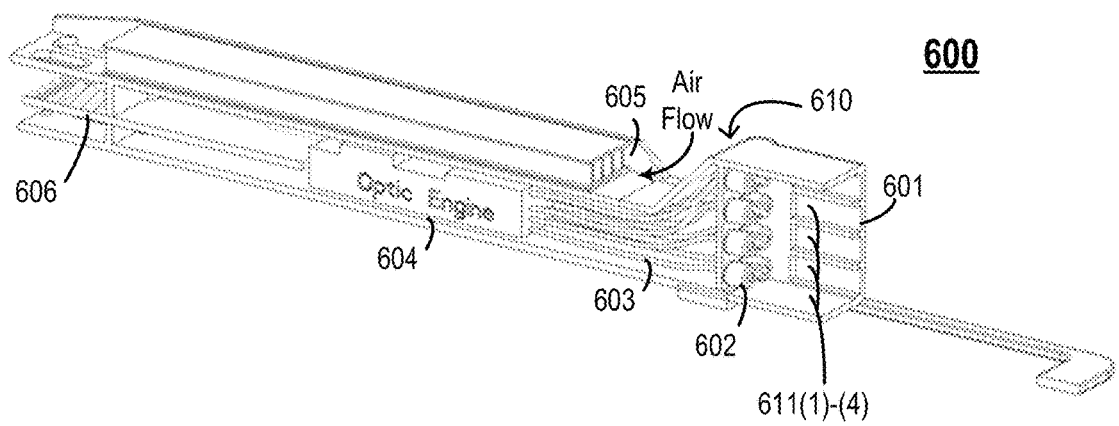
FIG. 6A illustrates a cut-away view of an example OSFP optical transceiver module according to an embodiment.

FIG. 6A illustrates a cut-away view of an example OSFP optical transceiver module 600 according to an embodiment. Optical module 600 may include sockets for eight (8) SN connectors or MDC connectors (one column of four (4) are shown here). In this example, proximate end 606 includes a high speed electrical OSFP interface coupled to an optical engine 604. Optical module 600 includes a plurality of optical fibers 603 coupled between optical engine 604 and fiber optic couplers 602 in sockets 611(1)-(4). In this example, each socket includes two (2) couplers 602. Optical engine 604 may include an optical transmit engine that includes lasers and eight modulators to generate optical transmit signals coupled to eight fibers to connect to transmit ports. Optical engine 604 may further include an optical receive engine having 8 receive ports that are connected to eight individual fibers to receive optical signals from receive ports. Optical engine 604 is thermally coupled to a heat sink 605, which receives air flow across a space between heat sink 605 and taper 610. FIG. 6A further illustrates guide slots 601 (or grooves) in sockets 611(1)-(4) to receive, guide, and secure SN or MDC fiber optic connectors. Further details and advantageous arrangements of guide slots 601 are described in more detail below.

Figure 6B:
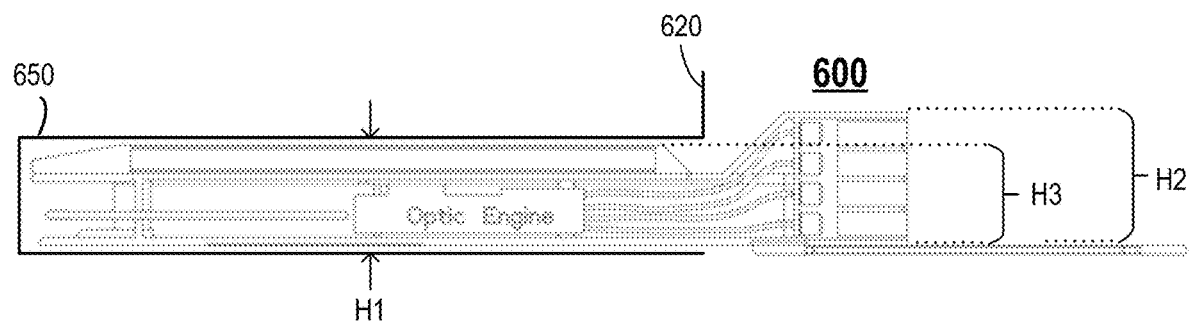
FIG. 6B illustrates a cut-away view of a mated OSFP optical transceiver module according to an embodiment.

FIG. 6B illustrates a cut-away view of a mated OSFP optical transceiver module according to an embodiment. In this example, OSFP optical module 600 is shown to be mechanically inserted in an port 650 having a height H1. The inserted portion of module 600 has a height H3 that is less than or approximately equal to H1 as shown, and the portion of module 600 extending outside slot 650 has a height H2 with 8 slots to receive 8 SN or MDC connectors, each arranged horizontally as 4 rows and 2 columns to maintain a constant width across the entire module yet having an increased height. As illustrated by chassis vertical surface 620, there may be room on the fully configured chassis in the vertical direction but not the horizontal direction.

Figure 6C:
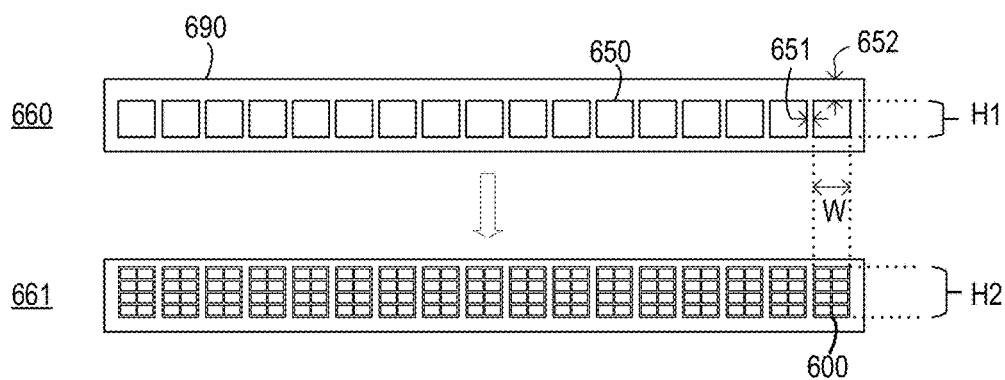
FIG. 6C illustrates example OSFP ports in a network device chassis according to an embodiment.

FIG. 6C illustrates example OSFP ports in a network device chassis 690 according to an embodiment. FIG. 6C illustrates one example of port spacing. At 660, ports 650 in chassis 690 are empty. Each port has a height H1 and width W. As illustrated, a distance 651 between ports in the horizontal direction may be smaller than a distance 652 available above ports (e.g., or below) so that chassis 690 can include a large number of ports, for example. At 661, optical modules 600 described above are inserted into the ports 650. Increasing the cross section of the portion of the optical modules that extends outside the ports in the vertical direction (e.g., H2) advantageously allows for more sockets and fiber connectors without impacting the number of ports available on the panel. In this example, this is made possible by arranging SN and MDC sockets/fiber connectors in two columns with the long axis along the horizontal axis to maintain the width within the allotted width W, while arranging the connectors four rows to produce a total of 8 sockets available module for each port. In one example implementation, an OSFP optical transceiver module and chassis may have the following dimensions (referring to FIGS. 2, 6B, and 6C): H1: 14.6 mm, H3: 13 mm, H2: 19 mm, H4 (socket height): 3.9 mm, W1: 22.58 mm, W2: 22.98 mm (slight gap from W1), W4 (socket width): ~10.5 mm (slightly differ between SN and MDC), distance 651: 0.25 mm, and distance 652 may allow 19 mm, for example.

Figure 7A:
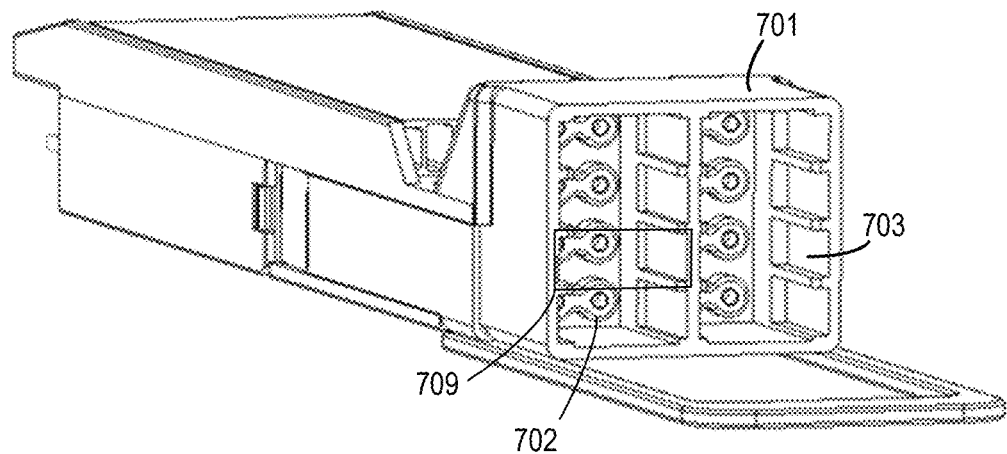
FIG. 7A illustrates an example OSFP optical transceiver module with MDC mini-duplex connector sockets according to an embodiment.

FIG. 7A illustrates an example OSFP optical transceiver module 700 with mini-duplex connector (MDC) sockets according to an embodiment. An MDC connector, for example, is a very small form factor optical connector designed to provide four (4) separate two-fiber connections into a QSFP-DD module and two (2) separate two-fiber connections into a SFP-DD module. A push-pull boot may allow for simple insertion (and removal) of the MDC connectors to (and from) the receptacles. In this example, eight (8) MDC sockets 709 are configured in two (2) columns and four (4) rows in distal end 701, where the sockets 709 are configured to receive the connectors in a horizontal configuration (e.g., long axis along the horizontal). Fiber cables in the MDC connectors mate with fiber receptacles 702. MDC connectors are engaged, positioned, and secured in the sockets using grooves 703.

Figure 7B:
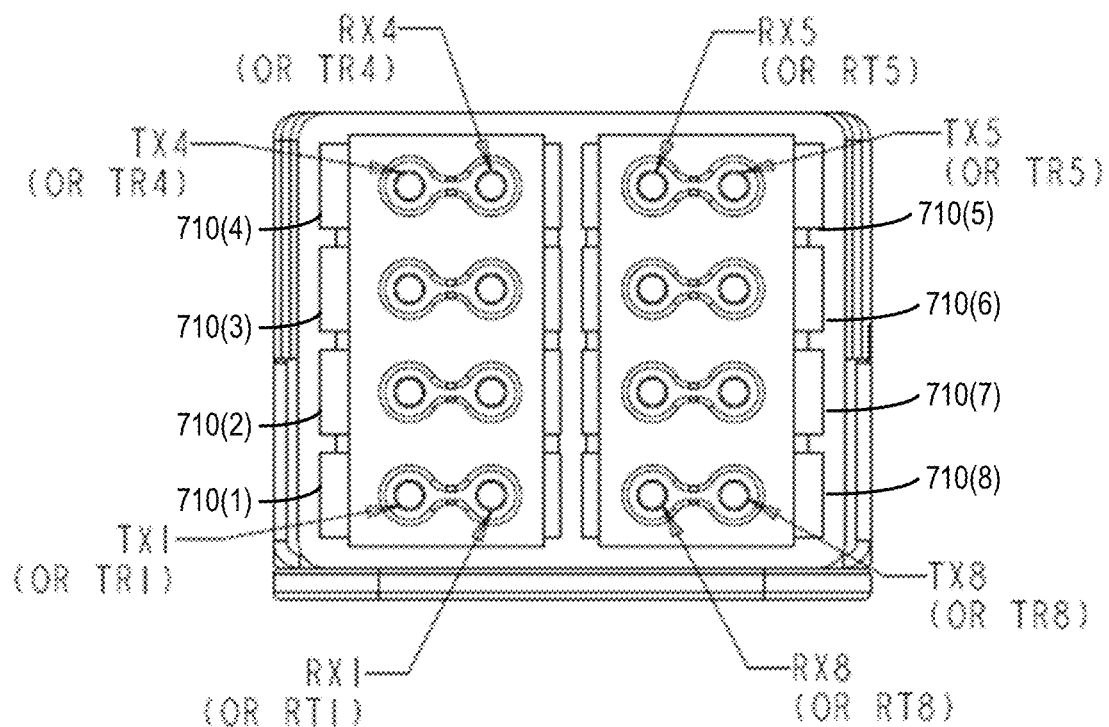
FIG. 7B illustrates a view of the MDC mini-duplex connector sockets of FIG. 7A according to an embodiment.

FIG. 7B illustrates a view of the mini-duplex connector (MDC) sockets of FIG. 7A according to an embodiment. FIG. 7B illustrates another advantageous feature of various embodiments where optical module fiber connector sockets are configured to engage latches (or ejectors) on the fiber optic connectors. Advantageously, the sockets may be configured to engage the latches along outer horizontal edges of the distal end (e.g., sockets and connectors engage such that the ejectors of each connector in each column are directed outwardly in opposite directions). Referring again to FIG. 7B, sockets 709 may each include latch engagement regions 710(1)-(8), which are configured to engage MDC connector latches along outer horizontal edges of the distal end 701. Each fiber receptacle may receive (RX) optical signals, transmit (TX) optical signals, or transmit and receive (RT/TR; bidirectional) optical signals, as illustrated in FIG. 7B.

Figure 8A:
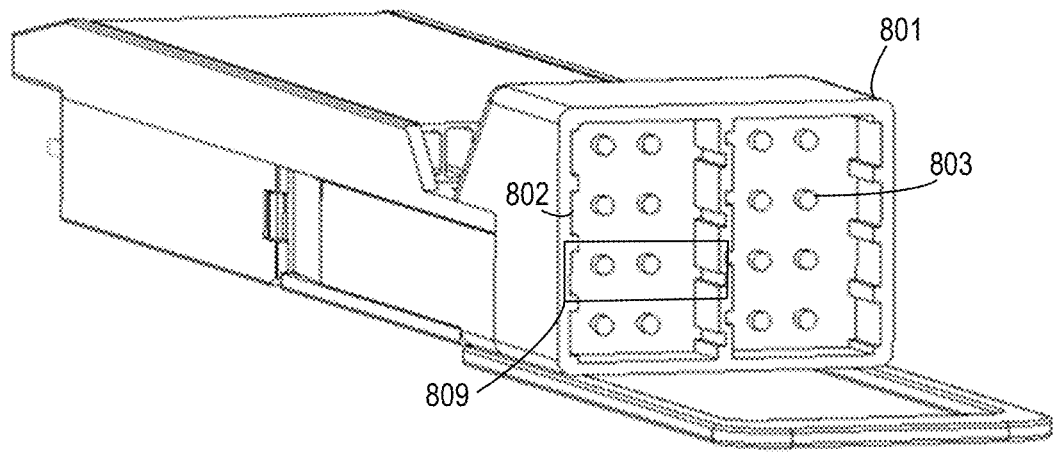
FIG. 8A illustrates an example OSFP optical transceiver module with SN® connector sockets according to an embodiment.

FIG. 8A illustrates an example OSFP optical transceiver module 801 configured with two columns and four duplex SN connector sockets 802 and 803 according to an embodiment. In this example, eight (8) SN sockets 809 are configured in two (2) columns and four (4) rows in distal end 801, where the sockets 809 are configured to receive the connectors in a horizontal configuration (e.g., long axis along the horizontal). Fiber cables in the SN connectors mate with fiber receptacles 803. SN connectors are engaged, positioned, and secured in the sockets using grooves 802.

Figure 8B:
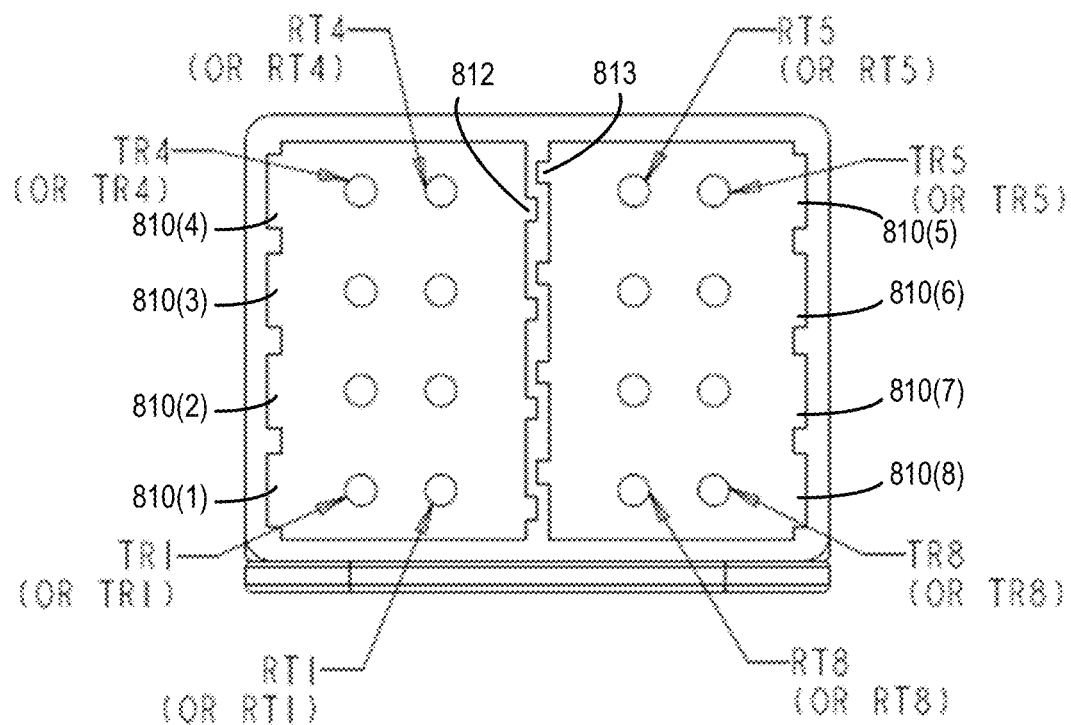
FIG. 8B illustrates a view of the SN connector sockets of FIG. 8A according to an embodiment.

FIG. 8B illustrates a view of the SN connector sockets of FIG. 8A according to an embodiment. In this example, SN sockets 809 may each include latch engagement regions 810(1)-(8), which are configured to engage SN connector latches along outer horizontal edges of the distal end 801. Each fiber receptacle may receive (RX) optical signals, transmit (TX) optical signals, or transmit and receive (RT/TR; bidirectional) optical signals, as illustrated in FIG. 8B. FIG. 8B further illustrates that grooves 812 and 813 for sockets in the same row, which share an interior vertical wall, may be adjacent to each other in the vertical direction and staggered, thereby further reducing the horizontal width of the socket and improving density.

Figure 9A:
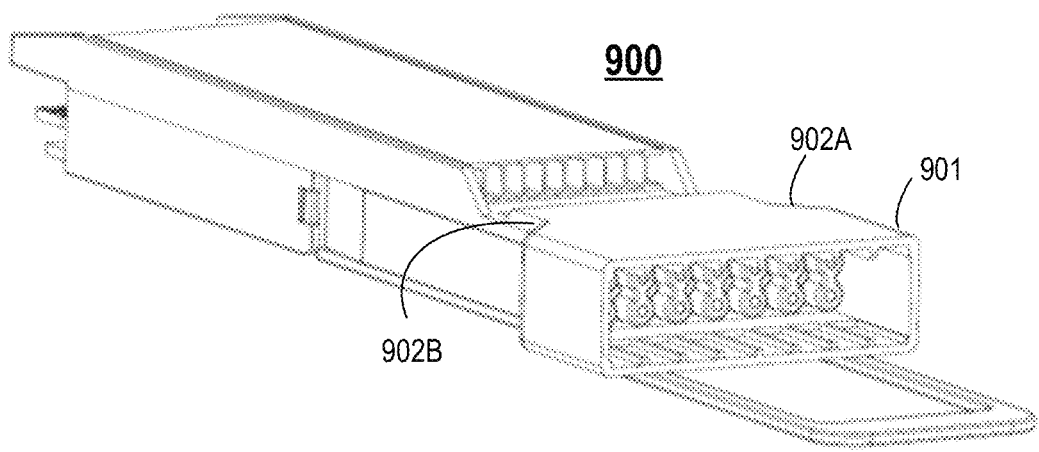
FIG. 9A illustrates another example OSFP optical transceiver module with MDC mini-duplex connector sockets according to an embodiment.
Figure 9B:
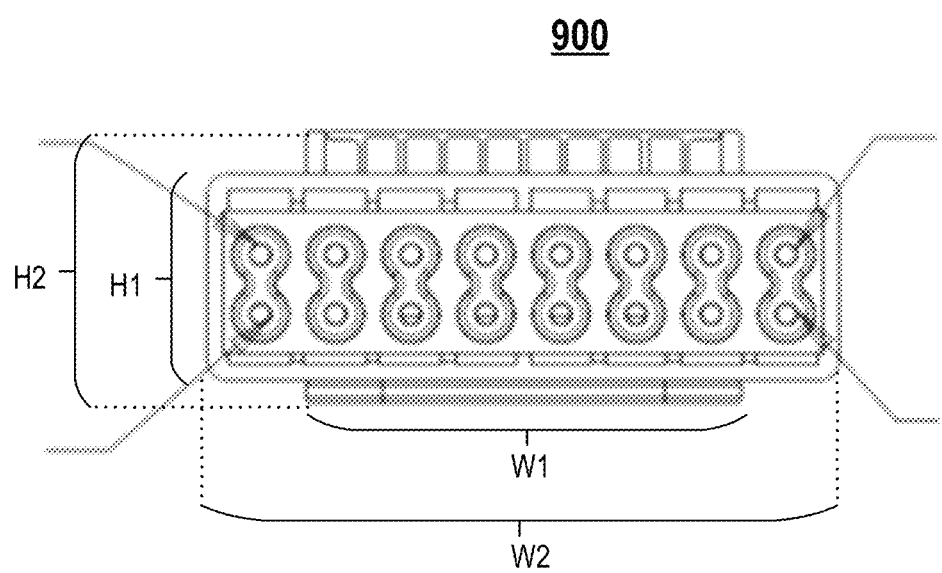
FIG. 9B illustrates a view of the MDC mini-duplex connector sockets of FIG. 7A according to an embodiment.

FIG. 9A illustrates an example OSFP optical transceiver module 900 configured with one horizontal row of duplex MDC connector sockets according to an embodiment. In this example, eight (8) MDC sockets are oriented vertically and arranged in one row relative to a horizontal baseline of the module in distal end 901. In this example, the sockets are configured to receive the connectors in a vertical configuration. Here, a width of the cross sectional area of the distal end 901 is greater than a width of the cross sectional area of the portion of the module that fits into a port. Thus, module 900 includes two tapers 902A-B. The widths and heights of this example are further illustrated in FIG. 9B.

Figure 10A:
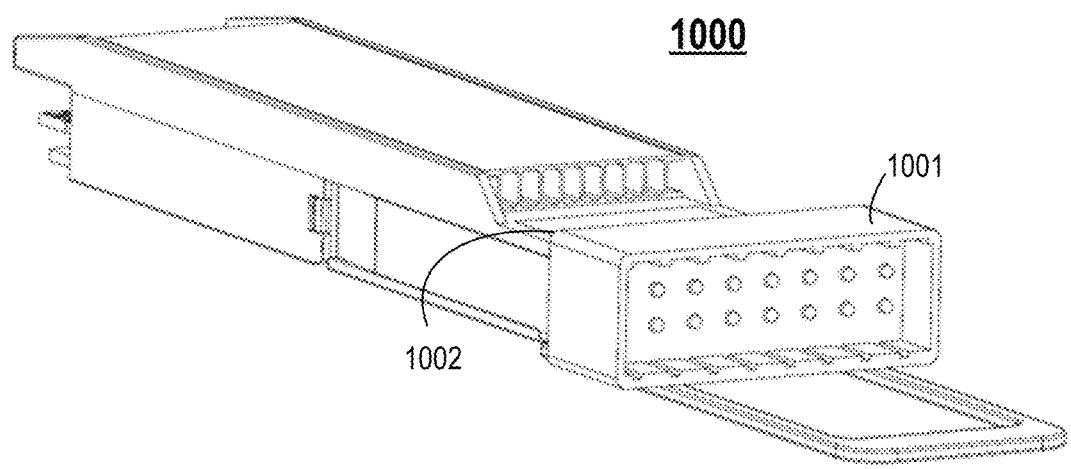
FIG. 10A illustrates another example OSFP optical transceiver module with SN® connector sockets according to an embodiment.
Figure 10B:
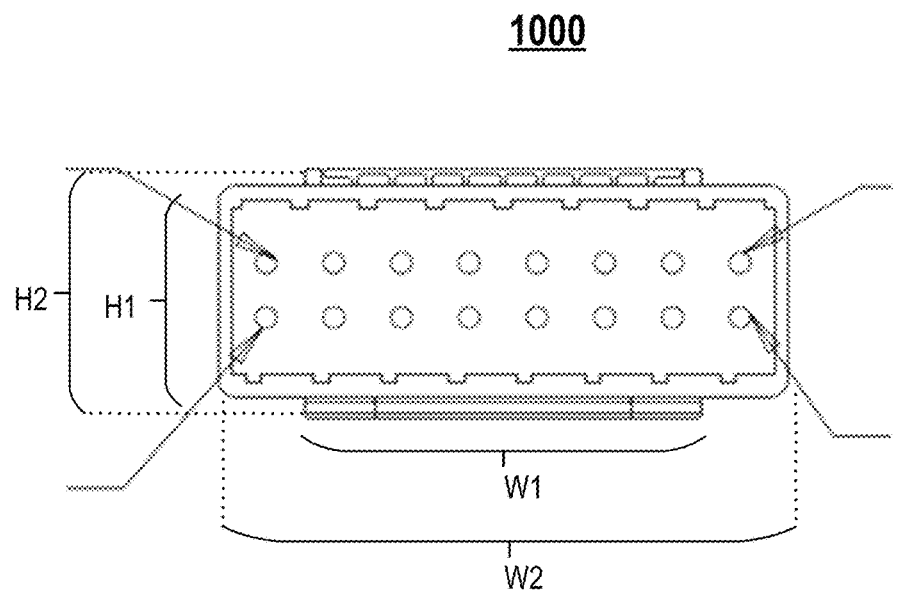
FIG. 10B illustrates a view of the SN connector sockets of FIG. 8A according to an embodiment.

FIG. 10A illustrates an example OSFP optical transceiver module 1000 configured with one horizontal row of duplex SN connector sockets according to an embodiment. In this example, eight (8) SN sockets are oriented vertically and arranged in one row relative to a horizontal baseline of the module in distal end 1001. In this example, the sockets are configured to receive the connectors in a vertical configuration. Here, a width of the cross sectional area of the distal end 1001 is greater than a width of the cross sectional area of the portion of the module that fits into a port. Thus, module 900 includes a taper 1002 around distal end 1001. The widths and heights of this example are further illustrated in FIG. 10B.

Figure 11:
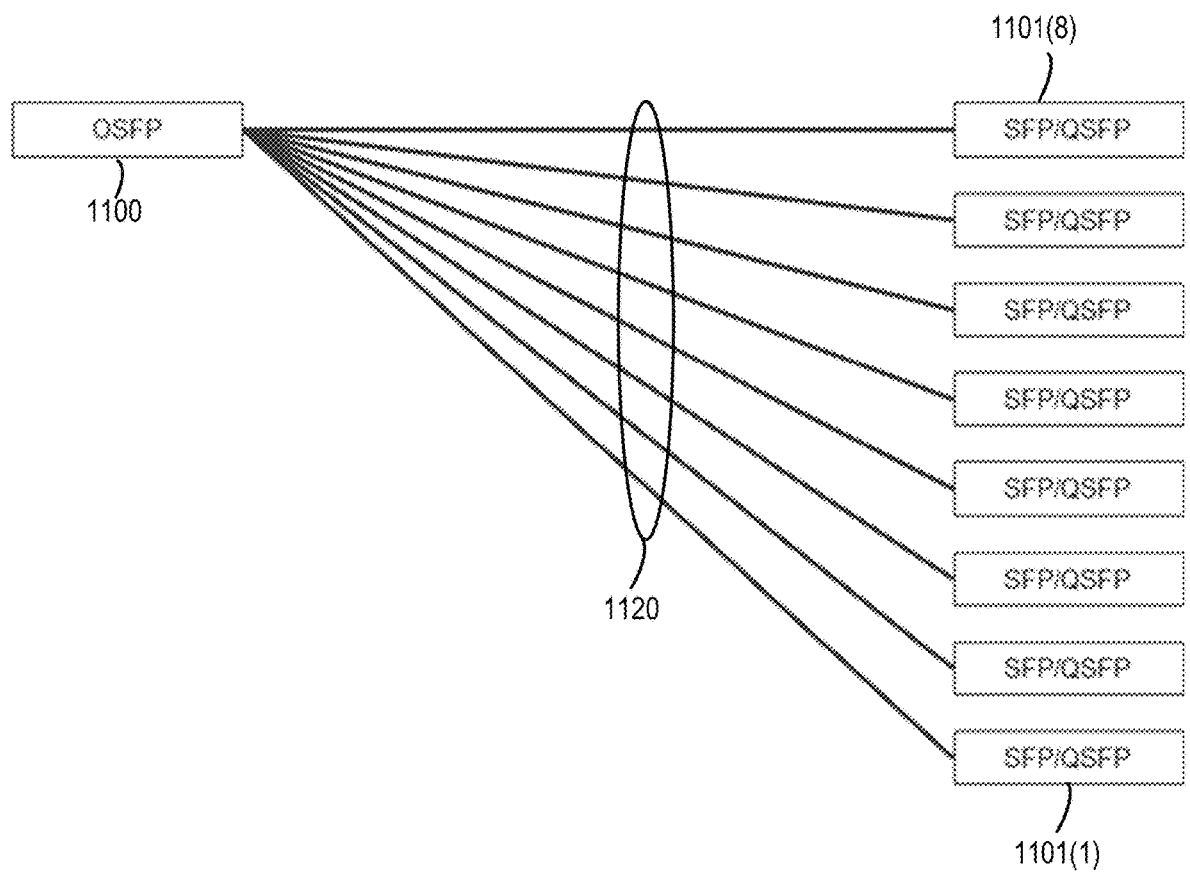
FIG. 11 illustrates fan out of an OSFP optical transceiver module according to an embodiment.

FIG. 11 illustrates fan out of an OSFP optical transceiver module according to an embodiment. In this example network topology, eight duplex fiber cables 1120 from OSFP optical transceiver module 1100 connect to eight other individual optical transceiver modules 1101(1)-(8) to fan out from a single networking port to eight individual other networking ports. Optical transceiver modules 1101(1)-(8) may be implemented using any standard transceiver module such as SFP or QSFP, for example.

Figure 12:
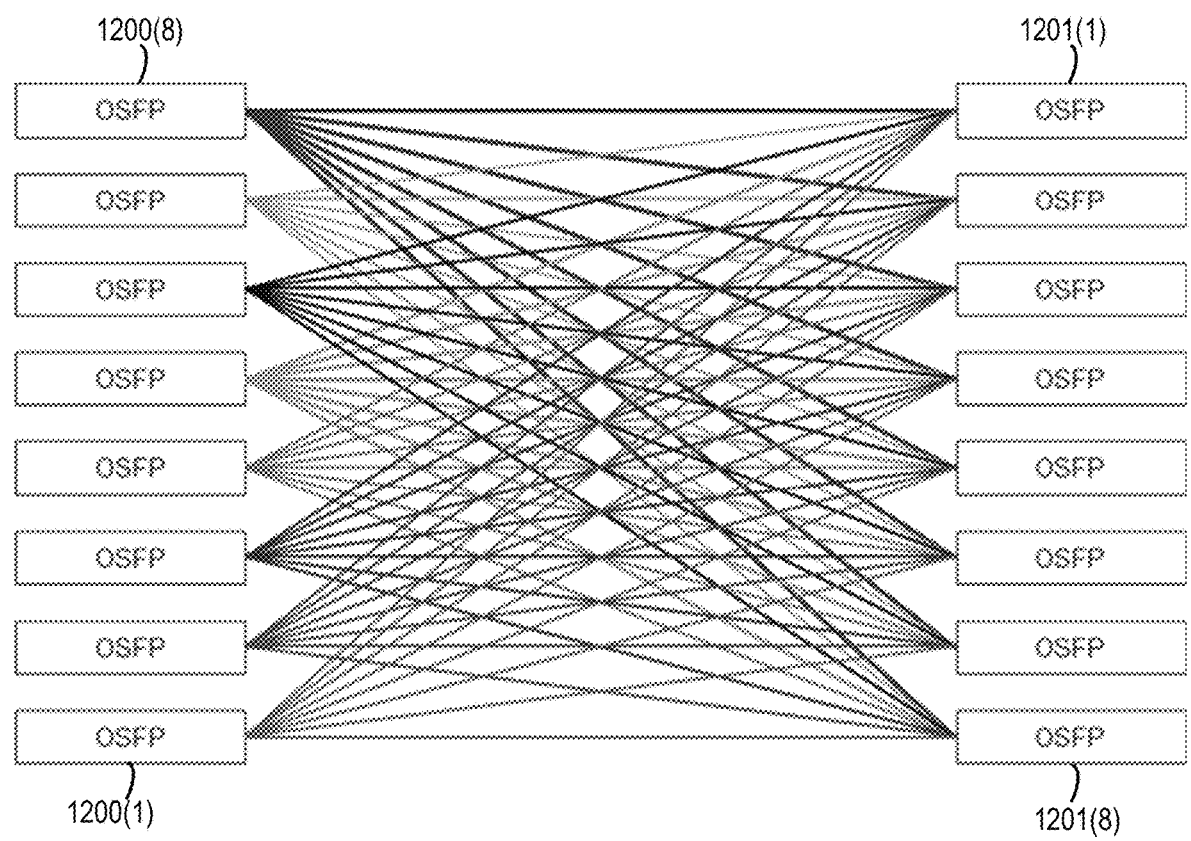
FIG. 12 illustrates a mesh of OSFP optical transceiver modules according to an embodiment.

FIG. 12 illustrates a mesh of OSFP optical transceiver modules according to an embodiment. In this example, a shuffle network topology of a set of eight OSFP optical transceiver 1200(1)-(8) described herein connect to a second set of eight OSFP optical transceivers modules 1201(1)-(8) such that each module is mesh connected to all other modules without requiring additional optics connectors or patch panels that impact the optical performance of these links and add costs.

Figure 13:
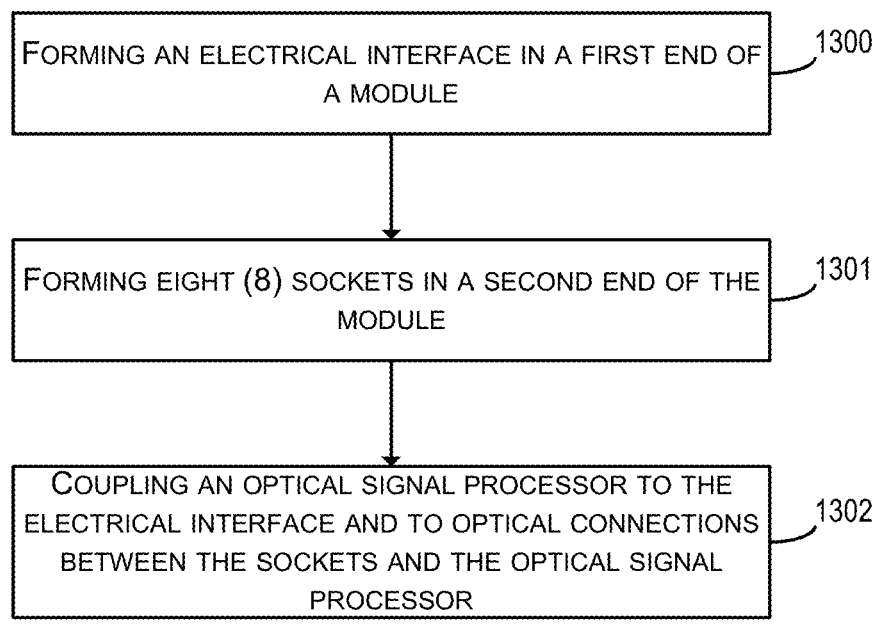
FIG. 13 illustrates a method according to an embodiment.

FIG. 13 illustrates a method of forming a pluggable optical transceiver module according to an embodiment. In various embodiments, pluggable optical transceiver modules including the features described herein may be made as follows. At 1300, an electrical interface compatible with an optical module port is formed in a proximate end of a pluggable optical transceiver module. The electrical interface may be an OSFP electrical interface, for example, that is compatible with an OSFP optical module port. At 1301, eight (8) sockets are formed in a distal end of the module and the module is configured to split an 800 G-DR8 input into eight (8) separate duplex fiber connections. In one embodiment, two (2) columns and four (4) rows of fiber sockets are formed in the distal end (4×2). In another embodiment, a single row of eight (8) vertically oriented sockets may be formed in distal end (1×8) as described above. Each socket may be formed to receive a SN or MDC fiber optic connector, for example, each of which is coupled to a plurality of optical fibers for sending and receiving optical signals. In some embodiments described above, the distal end is formed to have a larger cross section than the proximate end. For example, either a height or width of the distal end may be larger than the corresponding height or width of the proximate end to accommodate more sockets. As mentioned above, the sockets may be formed along the horizontal direction (e.g., 4×2) or the vertical direction (e.g., 1×8). Additionally, latch regions of the sockets may be formed outwardly facing. At 1302, an optical signal processor is coupled to the electrical interface and to a plurality of optical connections configured between each socket the optical signal processor. It is to be understood that additional features and components described herein may be formed as part of a method of forming a pluggable optical transceiver module according to other embodiments.

While the above description refers to OSFP modules, those of ordinary skill in the art would understand that the techniques described herein could also be practiced with other optics module form factors, such as industry standard QSFP-DD, for example. Also, while the description refers to SN and MDC connectors, the techniques described herein could be practiced with other optical connectors with similar dimensions, for example.

Further Examples

Each of the following non-limiting examples may stand on its own or may be combined in various permutations or combinations with one or more of the other examples.

In one embodiment, the present disclosure includes a pluggable optical transceiver module comprising: a proximate end having a form factor with a mechanical and electrical interface compatible with an industry standard module port; a distal end having eight (8) duplex fiber sockets, each socket configured to receive a duplex fiber optic connector coupled to duplex optical fibers for sending and receiving optical signals; and an optical signal processor coupled to the electrical interface of the module and a plurality of optical connections configured between each socket and a corresponding lens in the optical signal processor for: receiving optical signals generated in other optical transceiver modules into said pluggable optical transceiver module; and transmitting optical signals generated in said optical signal processor to other optical transceiver modules.

In one embodiment, the pluggable optical transceiver module is an Octal Small Form factor Pluggable (OSFP) optical transceiver module.

In one embodiment, the pluggable optical transceiver module is a Double-Density Quad Small Form factor Pluggable (QSFP-DD) optical transceiver module.

In one embodiment, the eight duplex fiber connectors are oriented horizontally and arranged in two columns of four rows relative to a horizontal baseline of the module.

In one embodiment, the sockets are configured to engage latches on the fiber optic connectors, and wherein the sockets are configured to engage the latches along outer horizontal edges of the distal end.

In one embodiment, the eight duplex fiber connectors are oriented vertically and arranged in one row relative to a horizontal baseline of the module.

In one embodiment, the sockets are mini-duplex connector (MDC) sockets.

In one embodiment, the sockets are SN mini-duplex connector sockets.

In one embodiment, each duplex fiber optic connector is coupled to eight (8) other individual optical transceiver modules.

In one embodiment, the eight (8) other individual optical transceiver modules comprise at least one of: a Small Form Factor Pluggable (SFP) transceiver, a Quad Small Form-factor Pluggable (QSFP) transceiver, a de-populated Quad Small Form-factor Pluggable Double density (QSFP-DD), or an OSFP optical transceiver.

In one embodiment, the eight (8) other individual optical transceiver modules are OSFP optical transceiver modules, and wherein the pluggable optical transceiver module and the eight (8) other OSFP optical transceiver modules are configured in a mesh network.

In one embodiment, each of the plurality of optical fibers coupled to the fiber optic connector is operated bidirectionally.

In one embodiment, a first portion of the pluggable optical transceiver module including the proximate end has a first cross sectional area configured to fit within an OSFP port when mated with the OSFP port, and wherein a second portion of the pluggable optical transceiver module including the distal end is configured to extend outside the OSFP port, the second portion comprising a second cross sectional area having a length along a first dimension that is less than or approximately equal to a length of the first cross sectional area and a length along a second dimension that is greater than a length of the first cross sectional area.

In one embodiment, a width of the first cross sectional area is less than or approximately equal to a width of the second cross sectional area and a height of the first cross sectional area is less than a height of the second cross sectional area.

In one embodiment, a width of the second cross sectional area is greater than a width of the first cross sectional area and a height of the second cross sectional area is less than or equal to a height of the first cross sectional area.

In one embodiment, a module according to the present disclosure further comprises at least one taper between the first cross sectional area and the second cross sectional area.

In one embodiment, a module according to the present disclosure further comprises a heat sink configured along an edge of the first portion of the pluggable optics transceiver module, wherein the taper is configured along the same edge, and spaced apart from, the heat sink.

In another embodiment, the present disclosure includes a method of forming a pluggable optical transceiver module comprising: forming, in a proximate end, an Octal Small Form factor Pluggable (OSFP) electrical interface compatible with a OSFP optical module port; forming, in a distal end, eight (8) duplex fiber sockets configured to split an 800 G-DR8 input into eight (8) separate duplex fiber connections, each socket configured to receive a SN or MDC fiber optic connector coupled to a plurality of optical fibers for sending and receiving optical signals; and coupling an optical signal processor to the electrical interface and to a plurality of optical connections configured between each socket the optical signal processor.

The above description illustrates various embodiments along with examples of how aspects of some embodiments may be implemented. Accordingly, the above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A pluggable optical transceiver module comprising:
   a proximate end having a form factor with a mechanical and electrical interface compatible with an industry standard module port;
   a distal end having eight (8) duplex fiber sockets, each socket configured to receive a duplex fiber optic connector coupled to duplex optical fibers for sending and receiving optical signals; and
   an optical signal processor coupled to the electrical interface of the module and a plurality of optical connections configured between each socket and a corresponding lens in the optical signal processor for:
      receiving optical signals generated in other optical transceiver modules into said pluggable optical transceiver module; and
      transmitting optical signals generated in said optical signal processor to other optical transceiver modules.

2. The pluggable optical transceiver module of claim 1, wherein the pluggable optical transceiver module is an Octal Small Form factor Pluggable (OSFP) optical transceiver module.

3. The pluggable optical transceiver module of claim 1, wherein the pluggable optical transceiver module is a Double-Density Quad Small Form factor Pluggable (QSFP-DD) optical transceiver module.

4. The pluggable optical transceiver module of claim 1, wherein the eight duplex fiber connectors are oriented horizontally and arranged in two columns of four rows relative to a horizontal baseline of the module.

5. The pluggable optical transceiver module of claim 4, wherein the sockets are configured to engage latches on the fiber optic connectors, and wherein the sockets are configured to engage the latches along outer horizontal edges of the distal end.

6. The pluggable optical transceiver module of claim 1, wherein the eight duplex fiber connectors are oriented vertically and arranged in one row relative to a horizontal baseline of the module.

7. The pluggable optical transceiver module of claim 1, wherein the sockets are mini-duplex connector (MDC) sockets.

8. The pluggable optical transceiver module of claim 1, wherein the sockets are SN mini-duplex connector sockets.

9. The pluggable optical transceiver module of claim 1, wherein each duplex fiber optic connector is coupled to eight (8) other individual optical transceiver modules.

10. The pluggable optical transceiver module of claim 9, wherein the eight (8) other individual optical transceiver modules comprise at least one of: a Small Form Factor Pluggable (SFP) transceiver, a Quad Small Form-factor Pluggable (QSFP) transceiver, a de-populated Quad Small Form-factor Pluggable Double density (QSFP-DD), or an OSFP optical transceiver.

11. The pluggable optical transceiver module of claim 9, wherein the eight (8) other individual optical transceiver modules are OSFP optical transceiver modules, and wherein the pluggable optical transceiver module and the eight (8) other OSFP optical transceiver modules are configured in a mesh network.

12. The pluggable optical transceiver module of claim 1, wherein each of the plurality of optical fibers coupled to the fiber optic connector is operated bidirectionally.

13. The pluggable optical transceiver module of claim 1, wherein a first portion of the pluggable optical transceiver module including the proximate end has a first cross sectional area configured to fit within an OSFP port when mated with the OSFP port, and wherein a second portion of the pluggable optical transceiver module including the distal end is configured to extend outside the OSFP port, the second portion comprising a second cross sectional area having a length along a first dimension that is less than or approximately equal to a length of the first cross sectional area and a length along a second dimension that is greater than a length of the first cross sectional area.

14. The pluggable optical transceiver module of claim 13, wherein a width of the first cross sectional area is less than or approximately equal to a width of the second cross sectional area and a height of the first cross sectional area is less than a height of the second cross sectional area.

15. The pluggable optical transceiver module of claim 13, wherein a width of the second cross sectional area is greater than a width of the first cross sectional area and a height of the second cross sectional area is less than or equal to a height of the first cross sectional area.

16. The pluggable optical transceiver module of claim 13, further comprising at least one taper between the first cross sectional area and the second cross sectional area.

17. The pluggable optical transceiver module of claim 13, further comprising a heat sink configured along an edge of the first portion of the pluggable optics transceiver module, wherein the taper is configured along the same edge, and spaced apart from, the heat sink.

18. A method of forming a pluggable optical transceiver module comprising:
   forming, in a proximate end, an Octal Small Form factor Pluggable (OSFP) electrical interface compatible with a OSFP optical module port;
   forming, in a distal end, eight (8) duplex fiber sockets configured to split an 800 G-DR8 input into eight (8) separate duplex fiber connections, each socket configured to receive a SN or MDC fiber optic connector coupled to a plurality of optical fibers for sending and receiving optical signals; and
   coupling an optical signal processor to the electrical interface and to a plurality of optical connections configured between each socket the optical signal processor.

* * * * *